United States Patent

[11] 3,625,526

[72] Inventor Harold E. McCormick
  Ballwin, Mo.
[21] Appl. No. 876,889
[22] Filed Nov. 14, 1969
[45] Patented Dec. 7, 1971
[73] Assignee Ramsey Corporation
  St. Louis, Mo.

[54] UNITARY SELF-ENERGIZING OIL CONTROL RING
  8 Claims, 11 Drawing Figs.
[52] U.S. Cl. .................................................. 277/151,
  277/219
[51] Int. Cl. ..................................................... F16j 9/06
[50] Field of Search ............................................ 277/149,
  151, 216, 138, 148, 150, 218, 219

[56] References Cited
UNITED STATES PATENTS

| 1,547,919 | 7/1925 | Huhn | 277/151 |
| 2,203,154 | 6/1940 | Johnston | 277/151 X |
| 2,520,369 | 8/1950 | McFall | 277/151 X |
| 3,006,704 | 10/1961 | Guyer | 277/216 X |

Primary Examiner—Robert I. Smith
Attorney—Hill, Sherman, Meroni, Gross & Simpson ABSTRACT: Oil control piston rings which have self-expanding properties eliminating the necessity for backup expander rings. The expansion is obtained by springs which are part of the ring structure. The preferred arrangements have hairpin springs projecting inwardly from the oil ring which, in use, extend through the oil drainage slots of the piston ring groove.

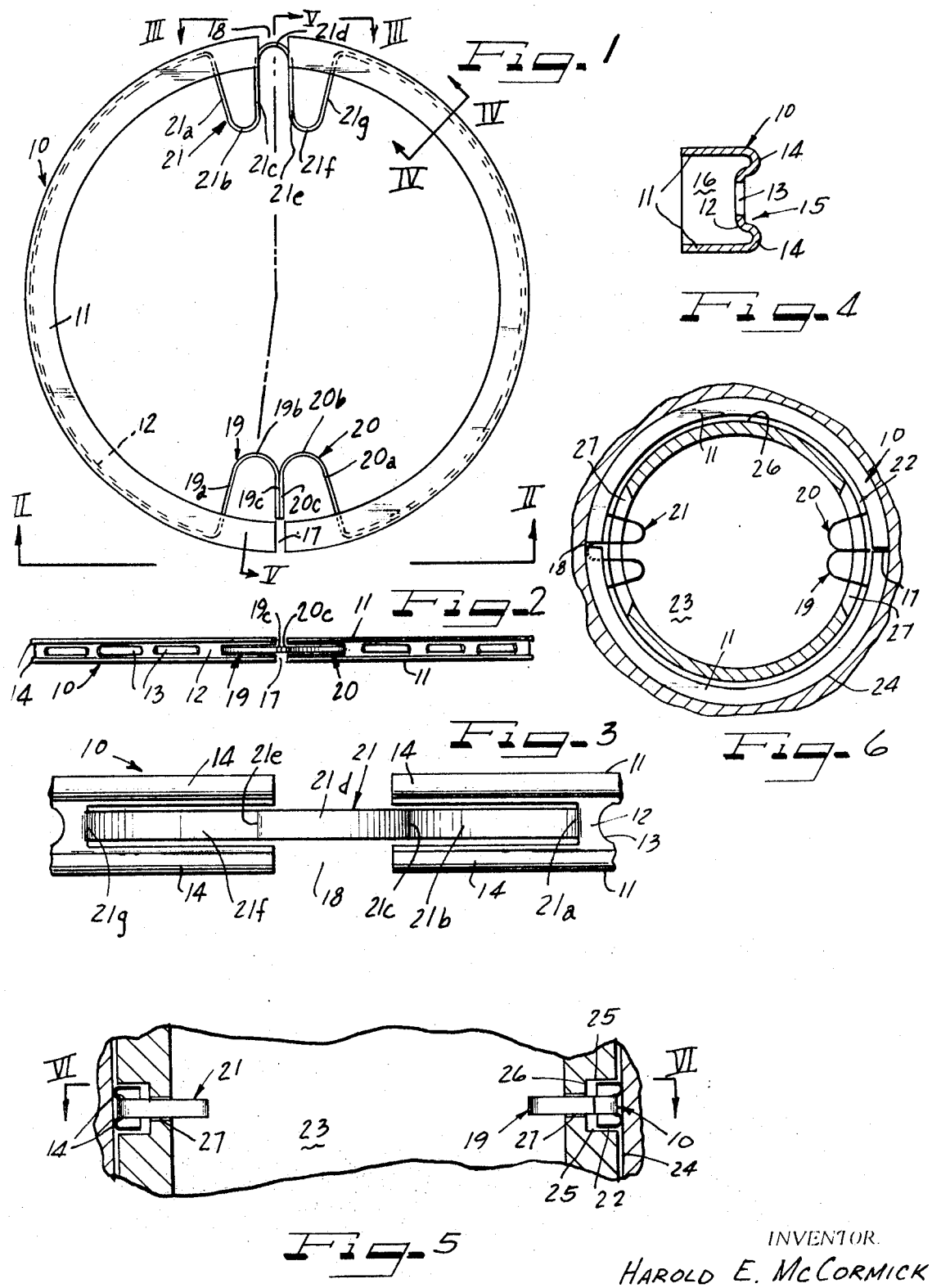

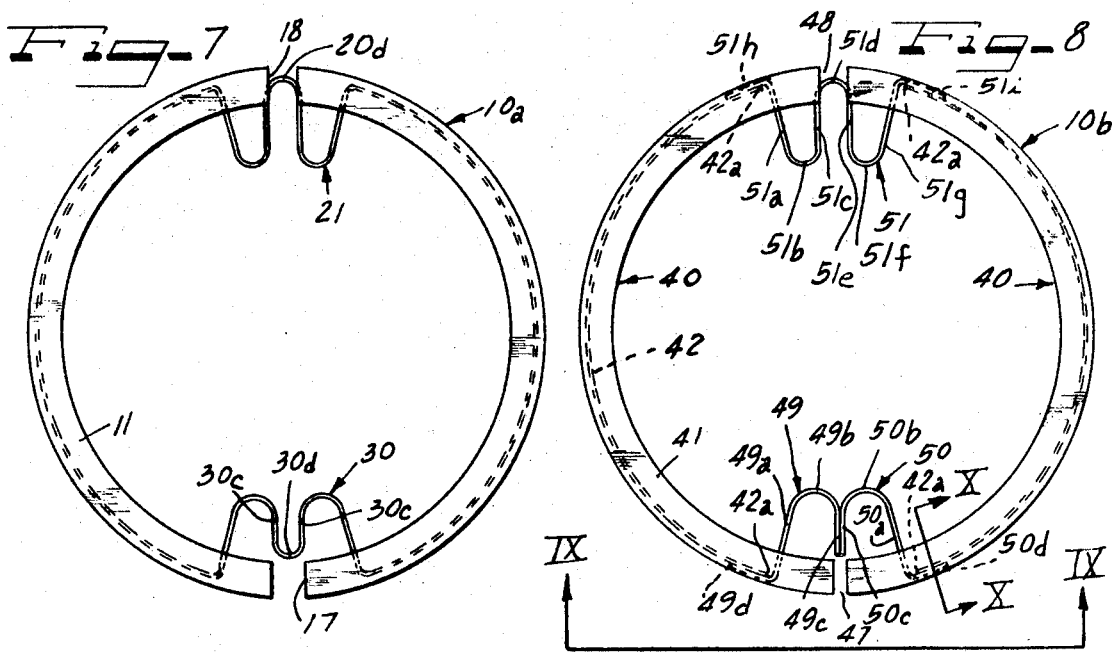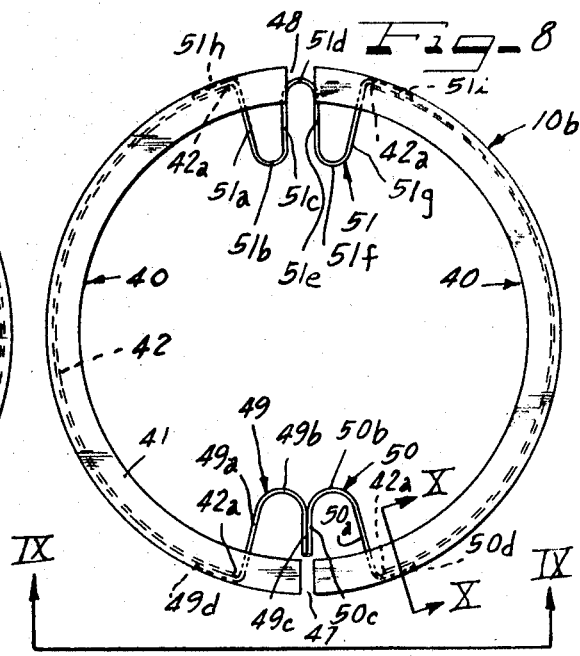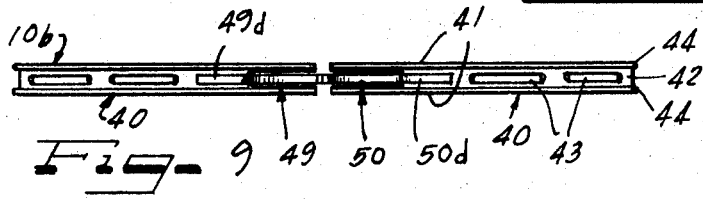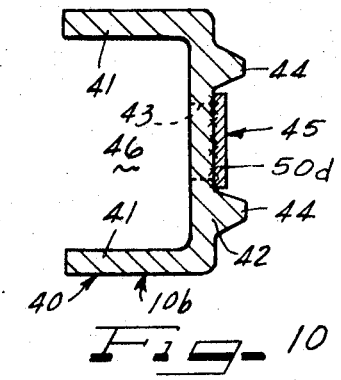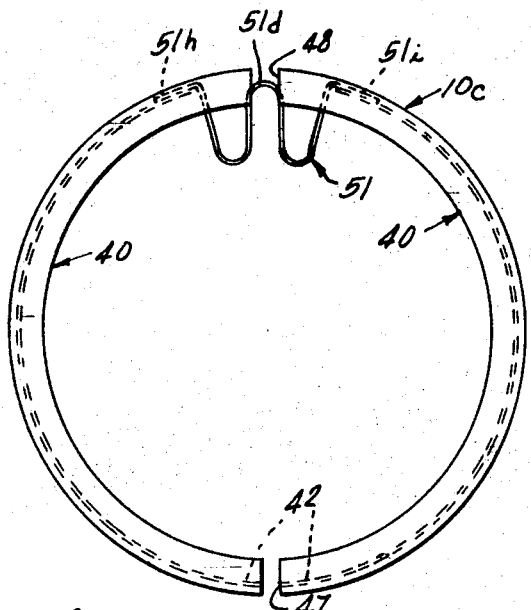

UNITARY SELF-ENERGIZING OIL CONTROL RING

BACKGROUND OF THE INVENTION

1. Field of the Invention

This invention relates to the packing ring or piston ring art, and especially to internal combustion engine piston oil control rings with built-in spring properties.

2. Description of the Prior Art

Oil control rings for internal combustion engine pistons have heretofore required backup expansion rings in order to control the load on the cylinder wall for maintaining the proper functioning of the ring as, for example, in the Mahew and Anderson U.S. Pat. No. 3,281,156 dated Oct. 25, 1966 and the Anderson U.S. Pat. No. 3,378,268 dated Apr. 16, 1968.

SUMMARY OF THE INVENTION

The present invention now eliminates the necessity for separate expansion rings for oil control rings and provides a unitary self-energizing oil control ring having its own built-in spring capacity.

According to the invention, an oil control ring, preferably of the slotted channel type, is equipped with leaf or hairpin springs projecting radially inward from the channel through the oil drainage slots or holes in the bottom of the oil ring groove of the piston. While it is preferred to provide diametrically opposed pairs of hairpin springs on the oil control ring, in some instances the spring may be located only at the split ends of the ring. The spring leaf itself is integral with or attached to the vertical wall of the channel, and in deep groove installations the spring may be convoluted within the confines of the ring groove to afford sufficient expansion force without projecting through the oil drainage hole or slot in the bottom of the ring groove.

It is then an object of this invention to provide a packing ring with its own built-in expansion spring.

A further object is to provide a one-piece, self-energizing oil control ring for pistons.

Another object of the invention is to provide an oil control ring for internal combustion engine pistons which has hairpin spring means expanding the ring.

A specific object of the invention is to provide a channel-type oil control ring in a plurality of segments joined by hairpin-type expansion springs.

A still further object of the invention is to provide a one-piece, split channel-type oil control ring with a ring expanding hairpin spring at the split ends thereof.

Other and further objects of this invention will be apparent to those skilled in this art from the following detailed descriptions of the annexed sheets of drawings which, by way of preferred embodiments, show several forms of the invention.

BRIEF DESCRIPTION OF THE DRAWINGS

FIG. 1 is a plan view of a self-energizing oil control ring of this invention;

FIG. 2 is a side view of the ring of FIG. 1 taken along the line II—II of FIG. 1;

FIG. 3 is an enlarged fragmentary side view taken along the line III—III of FIG. 1;

FIG. 4 is a cross-sectional view taken along the line IV—IV of FIG. 1;

FIG. 5 is a cross-sectional view taken along the line V—V of FIG. 1, and showing the ring mounted in the oil ring groove of an internal combustion engine piston in an engine cylinder;

FIG. 6 is a transverse cross-sectional view taken along the line VI—VI of FIG. 5;

FIG. 7 is a plan view of a modified oil ring of this invention;

FIG. 8 is a plan view of another modified oil ring of this invention;

FIG. 9 is a side elevational view of the ring of FIG. 8 taken along the line IX—IX of FIG. 8;

FIG. 10 is an enlarged cross-sectional view taken along the line X—X of FIG. 8;

FIG. 11 is a plan view of a still further modified oil ring of this invention.

DESCRIPTION OF THE PREFERRED EMBODIMENTS

The oil control ring 10 of FIGS. 1–6 is a split, rolled steel annulus of generally U-shaped cross section. The ring 10 has top and bottom radial or sidewalls 11 separated by an upstanding peripheral wall 12 for most of the circumference of the walls 11. The upstanding wall 12 has circumferential slots 13 at spaced intervals therearound. Rounded peripheral beads 14 project radially outward from the wall 12 in spaced parallel relation and, as indicated, are at the junctions between the walls 11 and 12. The ring 10 thus has an outwardly opening channel 15 between the beads 14 on the outer face of the upstanding wall 12 and an inwardly opening deeper channel 16 on the inner face of the wall 12. The slots 13 in the walls 12 provide for free flow of oil between the channels 15 and 16.

As shown in FIG. 1, the ring 10 has diametrically opposite gaps 17 and 18 at which the sidewalls 11 are circumferentially separated. Adjacent the gap 17, the upstanding wall 12 is separated from the walls 11 and directed radially inward therefrom to provide a pair of hairpin leaf springs 19 and 20. Thus, the wall 12 on one side of the gap 16 and in spaced relation from the gap is directed radially inward at 19a, then is curved outwardly at 19b, and next terminates in a radial outward leg 19c aligned with the gap 17. Similarly, the wall 12 on the other side of the gap 17 is directed radially inward at 20a in spaced relation from the gap, then is bent outwardly at 20b and terminates in a leg 20c, also aligned with the gap. The legs 19c and 20c abut each other. The sidewalls 11 project circumferentially beyond the legs 19a and 20a to terminate at the gap 17.

Similarly, the upstanding wall 12 is separated from the walls 11 on opposite sides of the gap 18. However, at the gap 18 a single, but multiple leg, hairpin or wave leaf spring 21 is provided. On one side of the gap 18 the wall 12 is directed radially inward at 21a in spaced relation from the gap, is thence turned outwardly at 21b to a radially outwardly directed leg 21c, which in turn is curved inwardly at 21d in the gap 18 to a radially inwardly directed leg 21e curved at 21f at its inner end and then directed radially outward at 21g to the wall 12 on the opposite side of the gap 18 in spaced relation from the gap. The single spring 21 acts in the same manner as the abutted-together springs 19 and 20 but, of course, the curved portion 21d of this spring serves to connect the ring portions on opposite sides of the gap 18, and a one-piece ring is thus provided.

Briefly, the ring 10 may be considered as two semicircular U-shaped channel segments in circumferentially spaced relation to provide gaps therebetween, and connected at one gap by a multiple-leg, radially directed leaf spring, and being split at the other gap where a pair of radially directed abutting leaf springs control the gap.

As shown in FIGS. 5 and 6, the oil control ring 10 is mounted in the oil ring groove 22 of an engine piston 23 mounted in an engine cylinder 24. The groove 22 has radially directed top and bottom sidewalls 25 and an axially directed backwall or bottom 26. This bottom 26 has circumferential slots 27 therethrough to accommodate free drainage of oil for free flow of oil between the groove 22 and the interior of the piston 23, as is customary in oil ring grooves.

The sidewalls 11 of the ring 10 fit freely between the sidewalls 25 of the groove 22, and the beads 14 of the ring 10 ride on the cylinder wall 24. The channel 15 of the ring 10 thus is closed on its outer face by the cylinder wall 24, while the channels 16 open to the slots 27 of the piston, while, of course the slots 13 of the ring connect the channels 15 and 16.

The springs 19, 20 and 21 project freely through the piston slots 27 and are effective to expand the ring 10 into proper seating engagement with the cylinder 24. In operation the springs 19 and 20 are abutted together at the split gap 17 of the ring, and, together with the spring 21, are circumferentially contracted so as to exert the expanding force on the ring. The legs or fingers of the springs 19, 20 and 21 can be of any suitable length to provide the desired spring force, and in operation the gaps 17 and 18 are substantially closed.

The ring 10 can be formed from a single ribbon or strip of steel, rolled to the indicated channel shape and provided with reduced width sections at spaced intervals to form the springs.

The modified ring 10a of FIG. 7 is identical with the ring 10 of FIGS. 1-6, with the exception that the two separate springs 19 and 20 are replaced with a single spring 30 which is the same as the spring 21. The ring 10a is thus continuous, since the spring 30, like the spring 21, has a connecting loop portion 30d between legs 30c. Thus, the sides of the gap 17 are connected through the spring 30 instead of being split, as in the ring 10. The ring 10a has advantages in certain installations to avoid buckling of the expander springs.

The ring 10a may be formed in the same manner as the ring 10, except that the loop-forming portion 30d of the spring 30 would have abutting ends welded together.

The modified ring 10b of FIGS. 8-10 is substantially identical with the ring 10, except that the channel portions are formed as separate segments and have a cast or forged body. The separate segments are connected by separate springs which are welded or otherwise fastened to the ends of the segments.

As shown in FIGS. 8-10, the ring 10b is composed of a pair of semicircular body segments 40, each having radially directed sidewalls 41 separated by an upstanding peripheral wall 42 which has circumferential slots 43 therethrough. Peripheral beads 44 project outwardly from the wall 42 on opposite sides of the slots 43 and extend circumferentially around the entire segment. It will be noted from FIG. 10 that these beads 44 are axially inward from the sidewalls 41. An outwardly opening channel 45 is provided between the beads 44 on the outer face of the wall 42, and an inwardly opening channel 46 is provided between the sidewalls 41 on the inner face of the wall 42.

The segments 40 are separated circumferentially by gaps 47 and 48 in diametrically opposed relation. The upstanding wall 42 of each segment 40 terminates in spaced relation from each gap 47 and 48, as indicated at 42a, so that the top and bottom radial walls 41 will project circumferentially beyond the walls 42 to the gaps 47 and 48.

Hairpin leaf springs 49 and 50 are provided at the gap 47, and these springs have the same leg arrangements as the springs 19 and 20 of the ring 10, and are similarly identified at 49a, 49b, 49c, 50a, 50b and 50c. In addition, however, the springs 49 and 50 have out-turned legs 49d and 50d, respectively, on the outer ends of the legs 49a and 50a, which overlie the walls 42 of the respective segments 40 and are secured thereto, as by means of spot welds or the like.

A spring 51 similar to the spring 21 of the ring 10, and having the convoluted legs and hump or curved portions 51a-51g, also has out-turned legs 51h and 51i on the outer ends of the legs 51a and 51g overlying the walls 42 of the respective segments 40 and secured thereto, as by spot welds or the like.

Alternately, the springs 49, 50 and 51 could be secured to the ring segments 40 by means of mechanical fastening devices, interlocking tabs or the like.

The ring 10b will function in the same manner as the ring 10, and could also be made continuous, like the ring 10a, by replacing the springs 49 and 50 with a single spring such as 30 of FIG. 10a.

In the modification of FIG. 11 the ring 10c is the same as the ring 10b, except that the springs 49 and 50 are omitted, and the gap 47 is a free gap, with the upstanding walls 42 of the segments 40 extending to the gap. In FIG. 11 parts identical with the ring 10b of FIGS. 8-10 have been marked with the same reference numerals, and it will be understood that the rings 10b and 10c differ only in the omission of the springs 49 and 50 and the extensions of the walls 42 of the segments 40 up to the gap 47. The ring 10c is useful in applications where the single spring 51 will supply sufficient expanding force.

From the above descriptions it will, therefore, be clear that rings such as 10, 10a, 10b and 10c of this invention may be further modified and rearranged as suggested above, and that the invention provides oil control rings with ample spring loading without separate expander springs or the like. The rings of this invention are thus unitary and self-energizing.

What I claim is:

1. A packing ring for installation in a ring groove to seal a contiguous surface which comprises an annular member having two circumferential gaps accommodating expansion and contraction, a one-piece leaf spring secured at opposite ends to said member in spaced relation to opposite sides of one of said gaps and extending radially inward from the member, and a pair of abutting leaf springs each secured in spaced relation to opposite sides of the other of said gaps and extending radially inward from said member, said leaf springs cooperating to expand the member against the contiguous surface and said pair of abutting leaf springs adapted to be separated for installation of the member in a ring groove.

2. A piston ring which comprises an annular body member having at least one gap in the periphery thereof accommodating contraction and expansion of the body member, and a hairpin spring means secured at its ends to said body member in spaced relation from opposite sides of said gap and extending inward from said body member to curved inner ends spaced radially from the body member and thence extending radially outward to a curved outer end lying in the gap and effective to expand the body member to widen said gap.

3. An oil control piston ring comprising a ring body of channel-shaped cross section having an upstanding peripheral wall, spaced parallel beads projecting radially from the outer periphery of said wall defining an outwardly opening channel therebetween and top and bottom sidewalls projecting radially inwardly from said upstanding wall defining an inwardly opening channel therebetween, circumferentially spaced slots through said upstanding wall joining said outwardly opening and inwardly opening channels, said ring having at least one gap therethrough accommodating radial expansion and contraction of the ring, said upstanding wall of the ring terminating in spaced circumferential relation from each side of said gap, and hairpin spring means carried by said ring projecting radially inward at the terminal ends of said upstanding wall and bridging said gap for expanding the ring.

4. The oil control piston ring of claim 3 wherein the spring means is a convoluted leaf spring with ends attached to the ring body on opposite sides of the gap.

5. An oil control piston ring comprising a split ring body of channel-shaped cross section adapted to expand from a closed gap position at the split ends thereof, said ring having radial walls held in axially spaced relation by an upstanding wall, said upstanding wall being separated from said radial walls in circumferentially spaced relation from both sides of the gap and directed radially inward and thence radially outward to provide a hairpin spring increasing the width of the gap between the split ends to expand the ring.

6. The packing ring of claim 5 wherein the hairpin spring is integral with said upstanding wall.

7. A piston ring which comprises a plurality of ring segments having gaps therebetween and upstanding peripheral walls terminating in circumferentially spaced relation from both sides of the gaps, and hairpin springs secured to the terminal ends of the upstanding walls at each gap and extending radially inward to curved inner ends spaced radially from the segments and thence extending radially outward from said inner ends to provide leaf springs effective to expand the ring.

8. The piston ring of claim 7 wherein the ring segments have channel-shaped cross sections and the hairpin springs are integrally connected with the upstanding walls of the channels on each side of each gap.

* * * * *